(12) United States Patent
Puntigam et al.

(10) Patent No.: US 11,598,482 B2
(45) Date of Patent: *Mar. 7, 2023

(54) HIGH-PRESSURE VESSEL

(71) Applicant: MAGNA Energy Storage Systems GesmbH, Sinabelkirchen (AT)

(72) Inventors: David Puntigam, Gross St.Florian (AT); Andreas Preitler, Gratkorn (AT); Rainer Puchleitner, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 123 days.

This patent is subject to a terminal disclaimer.

(21) Appl. No.: 17/173,836

(22) Filed: Feb. 11, 2021

(65) Prior Publication Data

US 2021/0262615 A1 Aug. 26, 2021

(30) Foreign Application Priority Data

Feb. 20, 2020 (EP) .................................... 20158504

(51) Int. Cl.
*F17C 1/06* (2006.01)
*F17C 1/16* (2006.01)

(52) U.S. Cl.
CPC .................. *F17C 1/06* (2013.01); *F17C 1/16* (2013.01); *F17C 2201/0109* (2013.01);
(Continued)

(58) Field of Classification Search
CPC ...... F17C 1/06; F17C 1/16; F17C 2201/0109; F17C 2203/0621; F17C 2203/066; F17C 2203/0673; F17C 2203/0675
See application file for complete search history.

(56) References Cited

U.S. PATENT DOCUMENTS 11,441,735 B2 * 9/2022 Puntigam ................. F17C 1/06
2004/0173618 A1 9/2004 Fujihara et al.
(Continued)

FOREIGN PATENT DOCUMENTS

CN 105705856 A 6/2016
CN 108131554 A 6/2018
(Continued)

OTHER PUBLICATIONS

Office Action for CN Patent Application No. 202110193521.3 dated May 27, 2022, 5 pages.

*Primary Examiner* — Don M Anderson
(74) *Attorney, Agent, or Firm* — Jordan IP Law, LLC; Todd A. Vaughn

(57) ABSTRACT

A high-pressure vessel that includes a cylinder, at least one half-shell, and a substantially rotationally symmetrical insert member. The cylinder, forming a middle region of the high-pressure vessel, is composed of a multilayer composite plastic having a first barrier layer. The at least one half-shell is formed at an axial end of the cylinder, and is composed of a multilayer composite plastic having a second barrier layer. The substantially rotationally symmetrical insert member has a foot member at an end thereof which faces an interior of the high-pressure vessel. The foot member has a diameter that is greater than a diameter of a middle region of the insert member. The foot member is configured to substantially form a hollow cone or hollow cylinder and at least a first groove or recess filled with the multilayer composite plastic of the at least one half-shell, and which is configured to extend around at least in certain portions on an inner circumference of the foot member.

16 Claims, 6 Drawing Sheets

(52) U.S. Cl.
CPC .................. *F17C 2203/066* (2013.01); *F17C 2203/0621* (2013.01); *F17C 2203/0673* (2013.01); *F17C 2203/0675* (2013.01)

(56) References Cited

U.S. PATENT DOCUMENTS

| | | | | |
|---|---|---|---|---|
| 2008/0251520 | A1* | 10/2008 | Ota | F17C 1/16 220/586 |
| 2011/0108557 | A1* | 5/2011 | Tani | F17C 1/16 220/586 |
| 2017/0268724 | A1* | 9/2017 | Kanezaki | F17C 1/04 |
| 2017/0284601 | A1* | 10/2017 | Kusaba | F17C 1/04 |
| 2019/0170300 | A1 | 6/2019 | Cola et al. | |

FOREIGN PATENT DOCUMENTS

| | | | |
|---|---|---|---|
| DE | 202015105901 | * | 10/2016 |
| EP | 3263968 | A1 | 1/2018 |
| JP | H10332083 | A | 12/1998 |
| JP | H10332085 | A | 12/1998 |

* cited by examiner

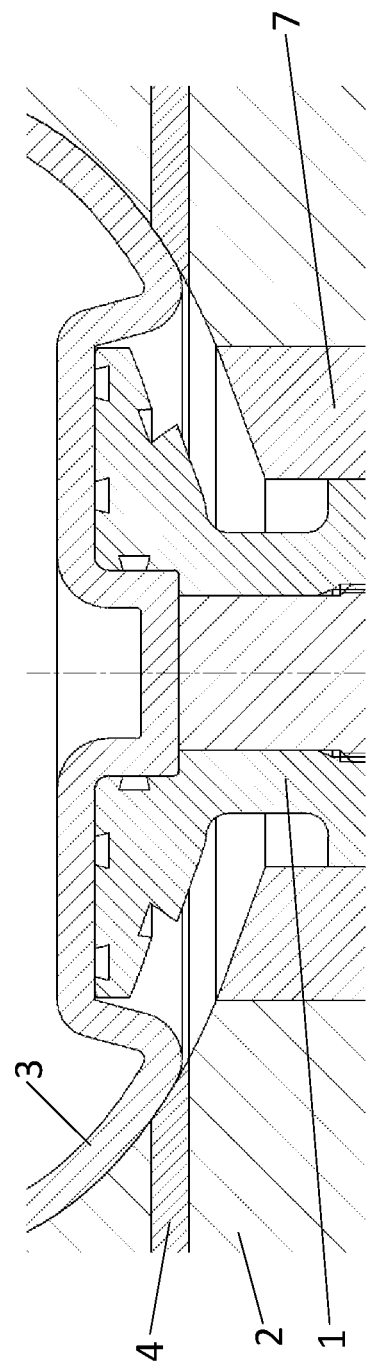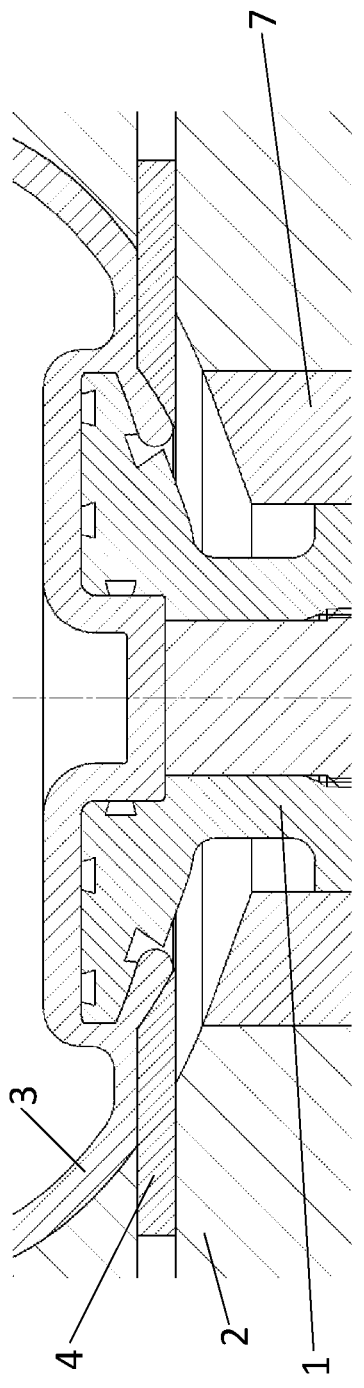

HIGH-PRESSURE VESSEL

CROSS-REFERENCE TO RELATED APPLICATIONS

The present application claims priority 35 U.S.C. § 119 to European Patent Publication No. EP 20158504.9 (filed on Feb. 20, 2020), which is hereby incorporated by reference in its entirety.

TECHNICAL FIELD

One or more embodiments relate to a high-pressure vessel, in particular, for the storage of a fuel for a motor vehicle.

BACKGROUND

It is known that high-pressure vessels, for example, for the storage of hydrogen as fuel for motor vehicles, can be constructed from an internal layer, the so-called "liner," and a winding of fibre material around the liner.

To produce a vessel, it is known to employ blow moulding and thermoforming technologies. The production is then based on the forming of tube-shaped or plate-shaped semi-finished products. The semi-finished products are brought into their final form by way of negative pressure and/or positive pressure. By way of example, it is possible for two half-shells to be generated which are joined to one another in order to form a vessel.

For the application of gas-tight liners for type IV vessels, which are used to store gases under pressure, there are two common production methods. Firstly, the blow moulding of entire liners, and secondly, the method of producing segments of the vessel in injection-moulding and extrusion processes and subsequently connecting the components by way of a joining process.

The materials used here are usually based on HDPE (high-density polyethylene) or polyamides. The mechanical low-temperature properties and the emission properties are important distinguishing features for liner materials. Monolayer materials such as polyamide have a good barrier property for gases but do not have optimal low-temperature properties. By contrast, HDPE does not have a suitable barrier action but has very good low-temperature properties.

For this reason, use is currently primarily made of polyamide particularly for applications in the field of hydrogen. However, as a result, limits with regard to component size are set in particular for blow moulding technology. Moreover, the available suitable types, on account of their complex additivation, are expensive and problematic for use at low temperatures.

High-pressure vessels for gases are subjected to large temperature fluctuations in the course of their operation (filling, storing and emptying). This presents high requirements on the materials and especially on the liner.

In conjunction with the lightweight construction and the use of composite materials, in this context the challenge is to connect the different materials to one another at the joining point in a gas-tight manner.

SUMMARY

It is an object of the invention to improve a high-pressure vessel in this regard and in particular to specify a high-pressure vessel which, in a transition region to a boss, also meets the requirements on tightness and permeation for a high-pressure vessel and can be produced in a simple and cost-effective manner in the process.

The object is achieved by A high-pressure vessel that includes a cylinder, at least one half-shell, and a substantially rotationally symmetrical insert member. The cylinder, forming a middle region of the high-pressure vessel, is composed of a multilayer composite plastic having a first barrier layer. The at least one half-shell is formed at an axial end of the cylinder, and is composed of a multilayer composite plastic having a second barrier layer. The substantially rotationally symmetrical insert member has a foot member at an end thereof which faces an interior of the high-pressure vessel. The foot member has a diameter that is greater than a diameter of a middle region of the insert member. The foot member is configured to substantially form a hollow cone or hollow cylinder and at least a first groove or recess filled with the multilayer composite plastic of the at least one half-shell, and which is configured to extend around at least in certain portions on an inner circumference of the foot member.

In accordance with one or more embodiments, the material used for the liner, both in the middle region formed by the cylinder and in at least one, preferably in both axial end regions of the vessel, is a multilayer composite. Multilayer plastics of this kind can be formed in a simple manner via blow moulding or thermoforming or vacuum forming to give a half-shell. The cylinder in the middle region can for example likewise be blow-moulded or for example extruded.

In accordance with one or more embodiments, a boss is used which has a foot member with a diameter greater than an adjacent middle region of the boss.

The foot member thus forms an undercut in relation to a multilayer plastic of the liner, the multilayer plastic being introduced from the side of the foot member or of the vessel middle point. The foot member is hollow on the inside, in the region of its longitudinal middle axis, and therefore substantially forms a hollow cone or a hollow cylinder.

On an inner circumference of the hollow cone or hollow cylinder of the foot member, a first groove or recess extends at least in certain portions, that is to say for example in individual sectors, around the inner circumference, preferably also around the entire inner circumference of the hollow cylinder or hollow cone. The groove or recess is filled with the multilayer composite plastic of the half-shell. A "recess" can be configured similarly to a groove and in any case has at least one edge which acts as an undercut for the plastic lying therebehind, such that the multilayer plastic is retained in a form-fitting manner behind the edge in the region of the inner circumference.

As a result of the plastic of the multilayer plastic of the liner, the plastic having a barrier layer, the tightness in the region of the transition between the plastics liner and the boss is increased. In this case, the plastic in the first groove or recess, which is arranged on the vertical inner circumference, is well protected against detachment in the course of operation of the high-pressure vessel, such that the good sealing property of the vessel is particularly long-lasting.

The high-pressure vessel thus has good permeation properties also in the region of the transition to the boss. The production of the half-shell with embedded boss and of the entire high-pressure vessel is nevertheless possible in a cost-effective manner since, as will subsequently be described in more detail, the introduction of the plastic is possible via blow moulding or vacuum thermoforming in spite of an undercut at the foot member of the boss.

The multilayer composite plastic of the half-shell is preferably arranged axially on both sides of the foot member. The typically metallic boss is thus embedded in the plastic having the barrier layer.

The foot member preferably has at least a second groove which is filled with the multilayer composite plastic of the half-shell, wherein, in the vicinity of the inner circumference of the foot member, the second groove extends around at least in certain portions on the base of the foot member, the base facing the vessel interior. The groove is likewise primarily used to increase the tightness between the liner and the boss.

The foot member preferably has at least a third groove which is filled with the multilayer composite plastic of the half-shell, wherein the third groove extends around at least in certain portions on the top surface of the foot member, the top surface facing the outer side of the vessel. In addition to the increase in the tightness, the third groove also prevents detachment of the plastic from the boss on the top surface of the foot member.

The foot member preferably has at least a fourth groove which is filled with the multilayer composite plastic of the half-shell, wherein, in the vicinity of the outer circumference of the foot member, the fourth groove extends around at least in certain portions on the base of the foot member, the base facing the vessel interior. The groove also prevents detachment of the plastic from the boss.

The first groove and/or the second groove and/or the third groove and/or the fourth groove can have a trapezoidal form which gets larger towards the base of the groove, such that the form fit of the plastic in the groove is enhanced.

In each of the grooves, preferably in particular in the first and/or second groove, an additional sealing element can be arranged on the base of the groove.

A sleeve is preferably arranged radially on the inside in relation to the first groove, on the inside in relation to the inner circumference of the foot member, wherein the multilayer composite plastic of the half-shell is pushed by the sleeve against the inner circumference of the foot member and into the first groove. The plastic thus remains in the first groove in a reliable manner and the sealing action is further increased.

The multilayer composite plastic of the cylinder preferably transitions into the multilayer composite plastic of the half-shell. The barrier layer preferably extends in as continuous a manner as possible at the transition between the cylinder and the half-shell.

The multilayer composite plastic of the half-shell, and preferably also the multilayer composite plastic of the cylinder, preferably comprises at least one layer composed of HDPE and a barrier layer, in particular EVOH, and preferably also a regranulate, that is to say a regrind layer, and/or a second HDPE layer and/or at least one adhesion-promoter layer.

The high-pressure vessel preferably comprises two half-shells at the axial ends of the cylinder, wherein the two half-shells are preferably configured as described previously for the first half-shell. A fibre material, preferably a composite material comprising carbon fibres and/or glass fibres and/or epoxy resin, is preferably wound around the cylinder and the two half-shells.

In accordance with one or more embodiments, a method of production of a high-pressure vessel can preferably be effected by way of a tool having a first tool half which forms a die, the method comprising the steps of:

placing a preheated first plastics plate onto the first tool half, pressing or adhering the first plastics plate onto the first tool half via negative pressure or pressure, arranging the plastic of the first plastics plate in certain regions behind an undercut of an insert member such as, for example, a boss, at a lateral spacing from the insert member, or, after pressing or adhering the first plastics plate onto the first tool half, positioning the insert member such that plastic of the first plastics plate is arranged in certain regions behind an undercut (i.e., the boss) of the insert member at a lateral spacing from the insert member, pressing or adhering, via one or more of a slider, negative pressure, and pressure, the plastic of the first plastics plate behind the undercut, from a lateral spacing from the insert member onto the insert member such that a space behind the undercut of the insert member is filled with the plastic.

Preferably, the boss is thus inserted as insert member into the tool and enclosed in a blow moulding or thermoforming operation with the plastics plate, in particular a permeation-tight multilayer composite, and therefore the plastic also reaches regions behind an undercut. To this end, a plastics plate is initially suctioned or pressed onto the first tool half via negative pressure or pressure. In this case, the insert member can already be positioned such that the suctioning or pressing of the plastic onto the first tool half causes the plastic of the first plastics plate to be arranged in certain regions behind an undercut of the insert member, at a lateral spacing from the insert member.

As an alternative, it is only after the plastic has been suctioned or pressed onto the first tool half that the insert member can be positioned such that plastic of the first plastics plate is arranged behind the undercut at a lateral spacing from the insert member, for example in that the insert member is displaced or the insert member is only now introduced into the first tool half.

Thereafter, the plastic of the first plastics plate is pushed or suctioned, from a position lateral to the insert member, onto the insert member via a slider or negative pressure or pressure, such that a space behind the undercut of the insert member is filled with the previously laterally located plastic and a form fit is produced.

As a result, in spite of simple production via blow moulding or vacuum forming, the plastic also reaches regions behind the insert member and an improved sealing action of the plastic, in particular multilayer composite, towards the insert member, in particular towards the metallic boss, is produced. In order to achieve the inclusion into the plastic, sliders and/or a vacuum or compressed air are/is used.

As disclosed herein, "at a lateral spacing" is to mean substantially at a spacing from a longitudinal middle axis of the insert member, the axis preferably also being able to coincide with the longitudinal middle axis of the pressure vessel. The plastic can initially run substantially parallel to the longitudinal middle axis of the insert member and preferably also to the surrounding vessel wall. The plastic is then suctioned, blown or pushed substantially in a normal direction to the longitudinal middle axis of the insert member, in particular radially inwardly on all sides, towards the insert member.

The performance of the suctioning or pushing of the plastic onto the insert member temporally after the positioning of the insert member, such that the plastic is arranged in certain regions at a lateral spacing from the insert member, can also be performed in a continuous process, such that in each case the insert member is further moved and positioned, and in each case suctioning or pushing of plastic thereon is performed anew in the process, such that the positioning of the insert member and the suctioning or pushing of the plastic thereon behind the undercut take place virtually at the same time.

The half-shell thus produced can be connected to a second half-shell or to an extruded or blow-moulded multilayer cylinder in a further process step. This forms the core and thus the base for a further winding process, in which the vessel can obtain its mechanical strength by way of a composite material composed of carbon and/or glass and epoxy resin.

The tool preferably comprises a second tool half which forms a plunger, wherein the second tool half is driven onto the first tool half in order to configure the inner contour of the half-shell. To this end, the second tool half can shape the form of the first plastics plate in the interior of the half-shell. It is instead also possible for the second tool half to be fitted with a second plastics plate which configures the inner contour of the half-shell.

Preferably, after the first plastics plate has been suctioned or pressed onto the first tool half, the insert member is raised in relation to the first tool half in order to position the insert member such that plastic of the first plastics plate is arranged behind the undercut at a lateral spacing from the insert member. The raising operation can be performed with the aid of a movable receptacle for the insert member. In this case, the insert member can be arranged towards the vessel outer side on the first plastics plate, and the raising operation can thus be performed along the longitudinal middle axis of the insert member and preferably also along the longitudinal middle axis of the high-pressure vessel, in particular in the direction towards the subsequent centre of the vessel.

Preferably, after the space behind the undercut of the insert member has been filled with the plastic, the insert member can be lowered again in relation to the first tool half. Particularly preferably, the lowering operation takes place at the same time as the displacement of the second tool half onto the first tool half.

In accordance with one or more embodiments, it is only after the first plastics plate has been suctioned or pressed onto the first tool half that the insert member is placed onto the first plastics plate in order to position the insert member such that plastic of the first plastics plate is arranged behind the undercut at a lateral spacing from the insert member. The insert member can thus be arranged towards the vessel inner side on the first plastics plate. A second plastics plate can in turn be arranged towards the vessel inner side in relation to the insert member.

The plastic of the first plastics plate can be cut axially behind the plastic-filled space behind the undercut, such that there is no longer any plastic behind the undercut, in particular towards the vessel outer side in relation to the undercut.

Preferably, a preheated second plastics plate is placed onto the second tool half, after which the second plastics plate is suctioned or pressed onto the second tool half via negative pressure or pressure, and the second tool half with the second plastics plate is driven onto the first tool half in order to configure the inner contour of the half-shell.

Preferably, the first plastics plate is a multilayer composite, wherein the multilayer composite preferably comprises a layer composed of HDPE (high-density polyethylene) and a barrier layer, in particular EVOH (ethylene-vinyl alcohol copolymer). Particularly preferably, the multilayer composite also comprises a regrind material or regranulate and/or one or more adhesion-promoter layers. HDPE preferably forms the outermost layer of the multilayer composite and can additionally also form the innermost layer.

A method for producing a high-pressure vessel preferably comprises that a half-shell is produced by a method as described above, wherein the half-shell is connected to a further half-shell—which can for example likewise comprise an insert member and which can be produced in the same manner as described above—or to at least one—preferably extruded or blow-moulded—cylinder and an end cap in order to form a closed vessel.

A fibre material, preferably a composite material comprising carbon fibres and/or glass fibres and/or epoxy resin, is preferably wound around the closed vessel.

DRAWINGS

One or more embodiments will be illustrated by way of example in the drawings and explained in the description hereinbelow.

FIG. 7 illustrates a detail illustration of FIG. 3 in the region around the undercut of the insert member.

FIG. 8 illustrates a detail illustration of FIG. 4 in the region around the undercut of the insert member.

DESCRIPTION

Figure 1:
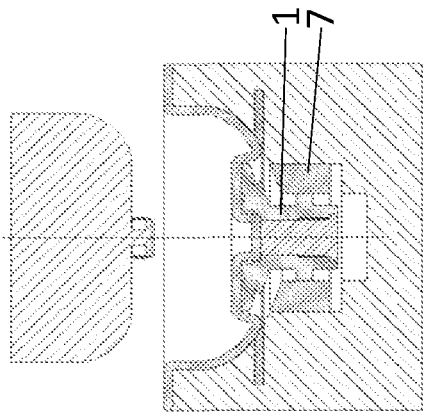
FIGS. 1 through 6 illustrate sectional views of a method for producing a half-shell for a high-pressure vessel, in a first embodiment.
Figure 2:
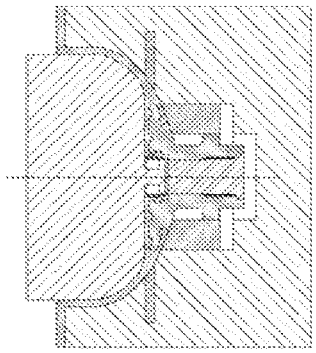

The illustrated embodiment of FIGS. 1 through 6 represent a method for producing a half-shell for a high-pressure vessel, in accordance with one or more embodiments. Use is made of a tool having a first tool half 2, which forms a die, and having a second tool half 5, which forms a plunger. The tool is thus composed of two tool halves, wherein the insert member is positioned on a movable receptacle 7 in the first tool half 2, preferably the lower tool half. The second tool half 5, preferably the upper tool half, functions as a plunger in order to apply a compressive action at the end of the process. In addition, the second tool half 5 can also be fitted with a second insert member. With the aid of sliders 4 provided in the tool and/or a vacuum, the plastic is brought to those points necessary for the form fit.

To this end, a preheated first plastics plate 3 is placed onto the first tool half 2 and the first plastics plate 3 is suctioned or pressed onto the first tool half 2 via negative pressure or pressure. Thereafter, the insert member 1, that is to say the boss, is positioned such that plastic of the first plastics plate 3 is arranged in certain regions behind an undercut, at a lateral spacing from the insert member 1.

Figure 3:
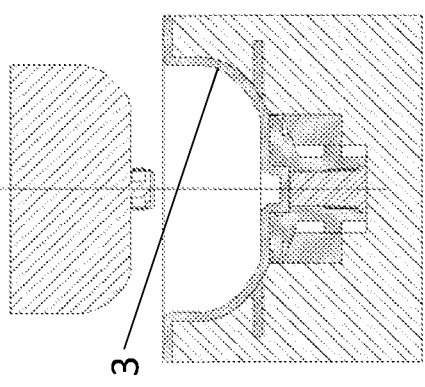

As illustrated in FIG. 3, as an alternative, the displacement of the insert member 1 can also be dispensed with, such that the plastic is suctioned directly onto a correctly positioned insert member 1.

The plastic of the first plastics plate 3 is then pushed or suctioned behind the undercut, from a lateral spacing from the insert member 1, onto the insert member 1 via a slider 4 or negative pressure or pressure, such that a space behind the undercut of the insert member 1 is filled with the plastic.

Finally, the second tool half 5 is driven onto the first tool half 2 in order to configure the inner contour of the half-shell.

The single-sheet process illustrated in FIGS. 1 to 6 comprises, in detail, the following steps.

As illustrated in FIG. 1, in a first step of the single-sheet process, the one tool half, namely the first tool half 2, is fitted with the insert member 1, namely a boss, and a preheated plastics plate 3. The insert member 1 is located in the starting position. At this point, it is optionally also possible for the second tool half 5 to be fitted with a further insert member. The plastics plate 3 is suctioned with the aid of a vacuum into the first tool half 2, which represents the outer component geometry.

Figure 4:
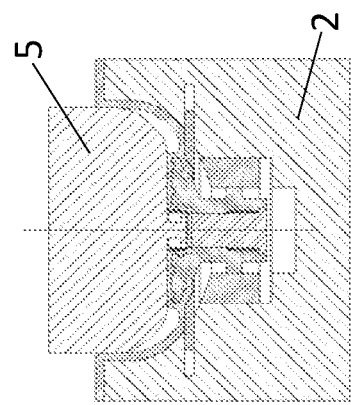

In order to fill the space behind the undercut of the insert member 1 with plastic, the space being necessary for the form fit, the insert member 1 is positioned on a movable receptacle 7 in the first tool half 2. As illustrated in FIGS. 3 and 4, as a result of the raising of the component and the for example simultaneous use of a vacuum and/or sliders 4, the space behind the undercut of the component is filled.

Figure 5:
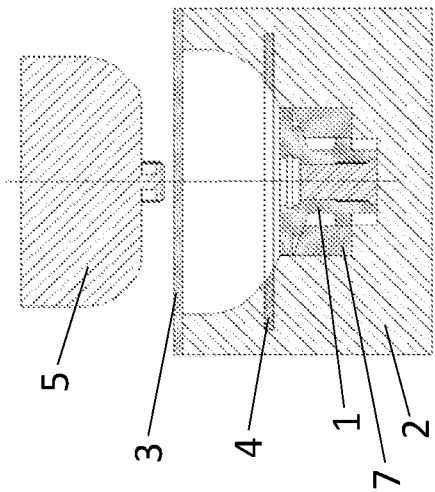
Figure 6:
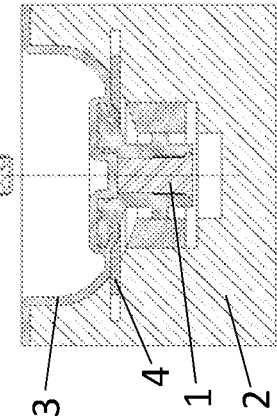

As illustrated in FIG. 5, in the next step, the second tool half 5 is lowered onto the first tool half 2 with a defined closing force and the inner contour of the component is represented. In the course of this process step, the insert member 1 may possibly be brought into the starting position again. As a result, the plastic behind the undercuts is additionally compressed and the form fit between the insert member 1 and the plastic of the first plastics plate 3 is enhanced.

The illustrated embodiment of FIGS. 9 through 14 represent an alternative embodiment of a production method, namely, a twin-sheet process for producing the half-shell.

Figure 9:
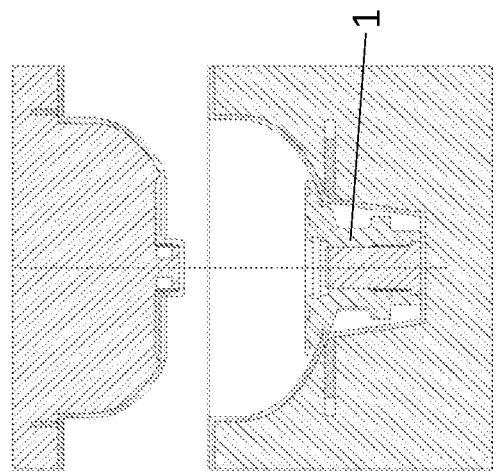
FIGS. 9 through 14 illustrate sectional views which show steps of a method for producing a half-shell for a high-pressure vessel according to the invention in a second embodiment.

As illustrated in FIG. 9, in a first step of the twin-sheet process, the two tool halves 2, 5 are fitted with a respective preheated plastics plate 3, 6. At this point, it is optionally also possible for the second tool half 5 to be fitted with an insert member.

Figure 10:
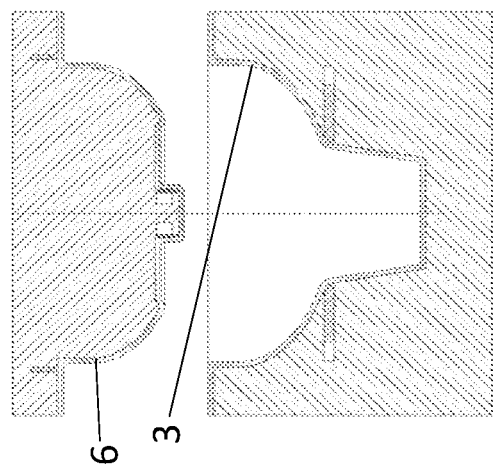

As illustrated in FIG. 10, the plastics plates 3, 6 are suctioned with the aid of a vacuum into or onto the respective tool halves 2, 5, which represent, respectively, the outer and inner component geometry.

Figure 11:
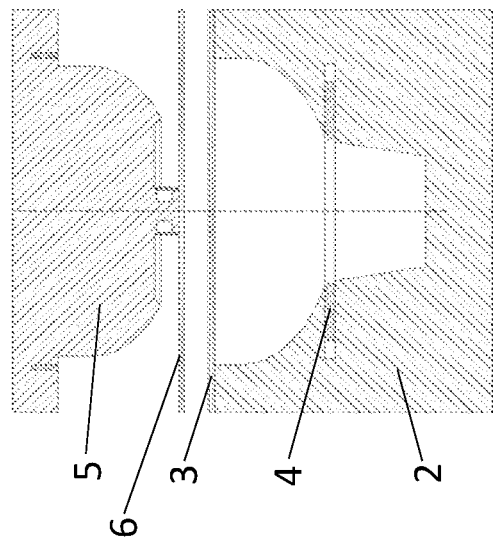

As illustrated in FIG. 11, in the next step, the insert member 1 to be enclosed is inserted into the first tool half 2.

Figure 12:
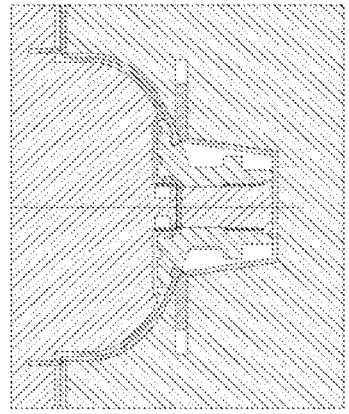

As illustrated in FIG. 12, with the aid of a vacuum and/or sliders 4, the space behind the undercut of the insert member 1, the undercut being necessary for the form fit, is filled with plastic.

Figure 13:
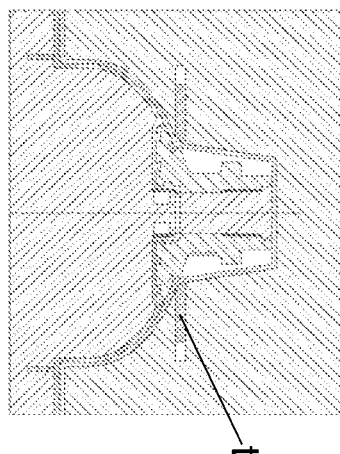

As illustrated in FIG. 13, the excess material is severed behind the undercut by cutting edges which are introduced into the tool. The cutting edges can also be contained, as illustrated in FIG. 13, in the sliders 4.

Figure 14:
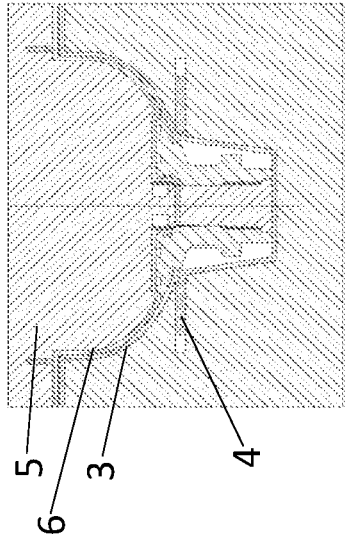

As illustrated in FIG. 14, the finished component is represented, wherein the excess plastic, below the undercut and the sliders 4, has been severed.

Figure 15:
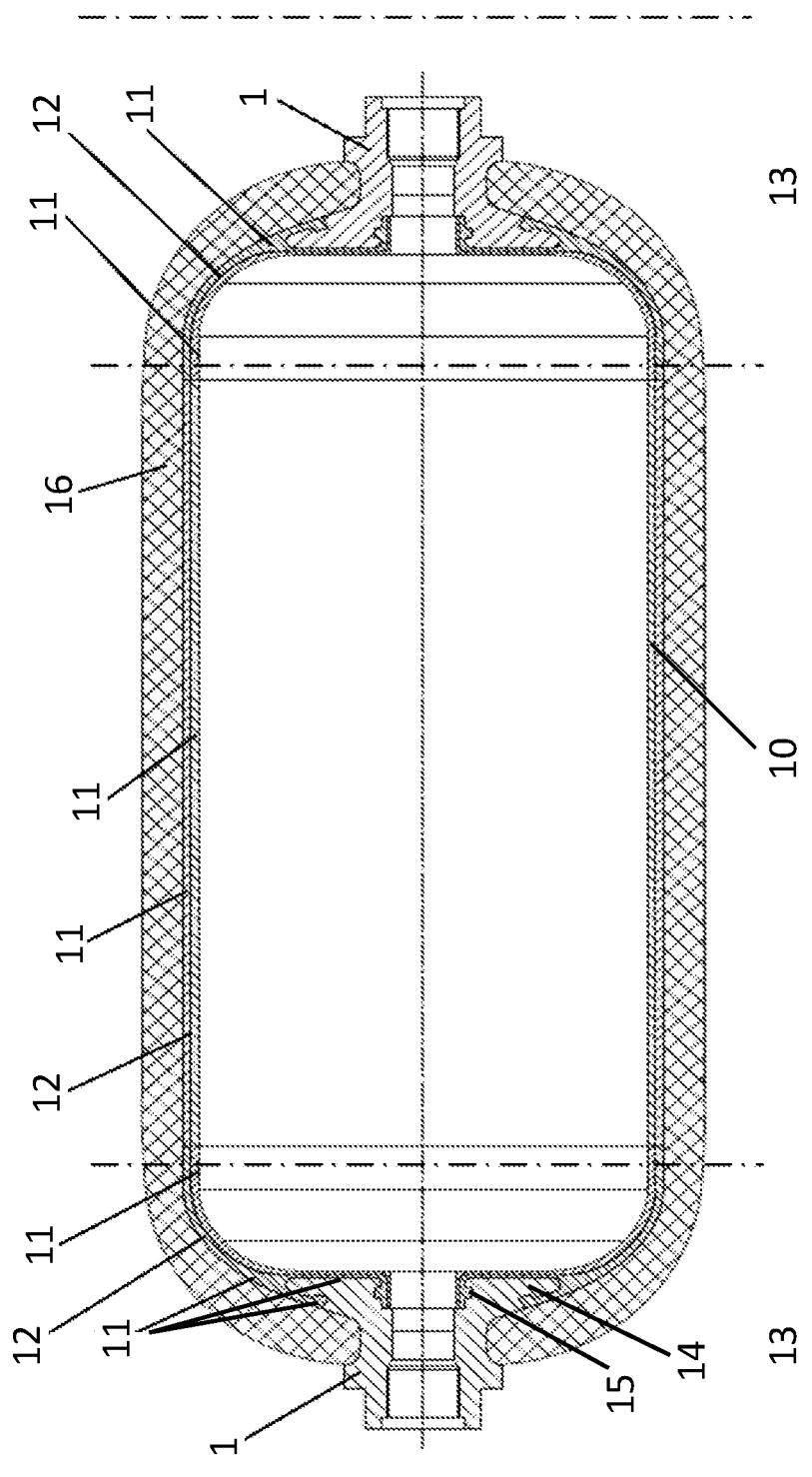
FIG. 15 illustrates a sectional view of a high-pressure vessel, in accordance with one or more embodiments.

As illustrated in FIG. 15, a high-pressure vessel is illustrated in accordance with one or more embodiments. The high-pressure vessel comprises a cylinder 10 forming a middle region of the high-pressure vessel, wherein the cylinder 10 is composed of a multilayer composite plastic 11 comprising a barrier layer 12, wherein the high-pressure vessel also comprises at least one half-shell 13 at an axial end of the cylinder 10, wherein the half-shell 13 is composed of a multilayer composite plastic 11 comprising a barrier layer 12, wherein the half-shell 13 also comprises a substantially rotationally symmetrical insert member 1, namely a boss, wherein the insert member 1 comprises an undercut in relation to a demoulding in the direction of the longitudinal middle axis of the insert member 1, wherein the multilayer composite plastic 11 of the half-shell 13 is arranged axially on both sides of the undercut of the insert member 1.

The undercut is formed by a foot member 14 at that end of the insert member 1 which faces the vessel interior, the foot member having a greater diameter than a middle region of the insert member 1. The multilayer composite plastic 11 is arranged axially on both sides of the foot member 14. The foot member 14 has a plurality of grooves 15 which are filled with the multilayer composite plastic 11 of the half-shell 13. The insert member 1 has substantially the form of a hollow cylinder. The foot member 14 has substantially the form of a hollow cone. A groove 15 filled with the multilayer composite plastic 11 of the half-shell 13 extends around on an inner circumference of the foot member 14.

The multilayer composite plastic 11 of the cylinder 10 transitions into the multilayer composite plastic 11 of the half-shell 13. The multilayer composite plastic 11 of the half-shell 13, and also of the cylinder 10, comprises a layer composed of HDPE as outermost layer and a barrier layer 12 composed of EVOH. The HDPE may be HDPE-S (black), and arranged thereafter may be a regranulate layer, an adhesion promoter, the EVOH layer, optionally an adhesion promoter again and optionally also an HDPE layer again as innermost layer.

The high-pressure vessel comprises two half-shells 13 at the axial ends of the cylinder 10, wherein the two half-shells 13 are configured as described above, that is to say have a boss 1 which is embedded in the multilayer composite plastic 11. A fibre material 16, preferably a composite material comprising carbon fibres and/or glass fibres and/or epoxy resin, is wound around the cylinder 10 and the two half-shells 13. Overall, a high-pressure vessel which can be used to store gases under high pressure is thus specified. The vessel is of lightweight construction and has a multipart multilayer plastics liner which is composed of two dome caps 13 and a cylinder 10 and which ensures the gas tightness and contains a permeation barrier 12.

Bosses 1, namely a "headstock" and a "tailstock", are integrated in the two dome caps 13. A barrier layer 12 contained in the layer structure of the liner provides the permeation properties both in the dome caps 13 and in the cylinder tube 10. The mechanical strength of the high-pressure vessel is provided by a fibre-reinforced composite 16, which is applied to the plastics liner in the winding process and subsequently cured.

Figure 16:
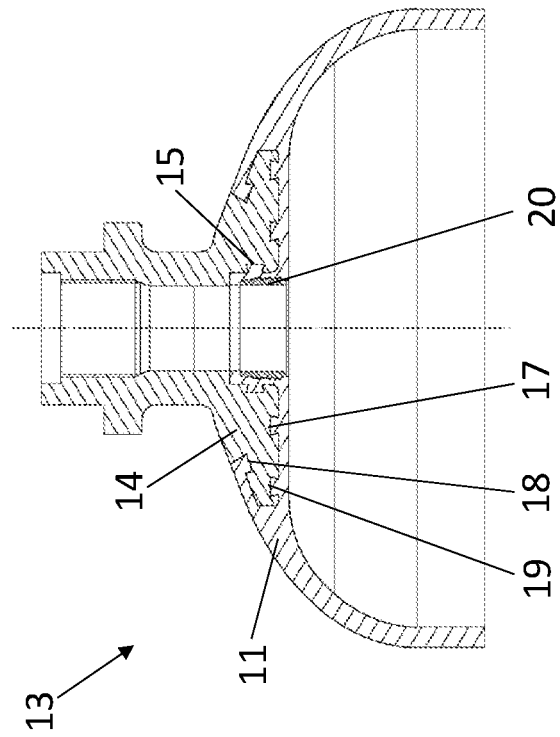
FIG. 16 illustrates a sectional view of a half-shell of a high-pressure vessel, in accordance with one or more embodiments.

As illustrated in FIG. 16, a half-shell 13 of a high-pressure vessel is illustrated in accordance with one or more embodiments. The half-shell 13 is composed of a multilayer composite plastic 11 comprising a barrier layer 12, wherein the half-shell 13 also comprises a substantially rotationally symmetrical insert member 1, namely a boss. The insert member 1 has a foot member 14 at that end of the insert member 1 which faces the vessel interior, the foot member having a greater diameter than a middle region of the insert member 1. The foot member 14 substantially forms a hollow cone. A first groove 15 filled with the multilayer composite plastic 11 of the half-shell 13 extends around the inner circumference of the foot member 14.

The multilayer composite plastic 11 of the half-shell 13 is arranged axially on both sides of the foot member 14. The foot member 14 has a second groove 17 which is filled with the multilayer composite plastic 11 of the half-shell 13, wherein, in the vicinity of the inner circumference of the foot member 14, the second groove 17 extends around on the base of the foot member 14, the base facing the vessel interior. The foot member 14 has a third groove 18 which is filled with the multilayer composite plastic 11 of the half-shell 13, wherein the third groove 18 extends around on the top surface of the foot member 14, the top surface facing the outer side of the vessel. The foot member 14 has a fourth groove 19 which is filled with the multilayer composite plastic 11 of the half-shell 13, wherein, in the vicinity of the outer circumference of the foot member 14, the fourth groove 19 extends around on the base of the foot member 14, the base facing the vessel interior.

Figure 17:
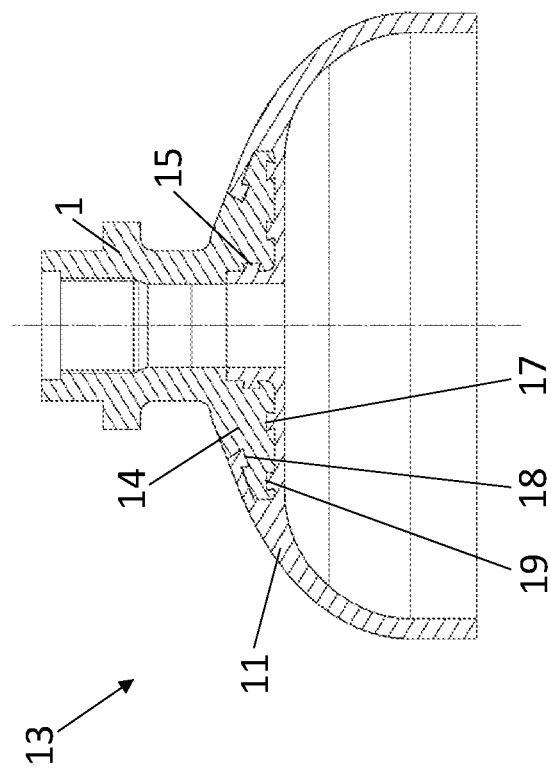
FIG. 17 illustrates a sectional view of a half-shell of a high-pressure vessel, in accordance with one or more embodiments.

As illustrated in FIG. 17, a sleeve 20 can be arranged radially on the inside in relation to the first groove 15, on the inside in relation to the inner circumference of the foot member 14, wherein the multilayer composite plastic 11 of the half-shell 13 is pushed by the sleeve 20 against the inner circumference of the foot member 14 and into the first groove 15.

Figure 19:
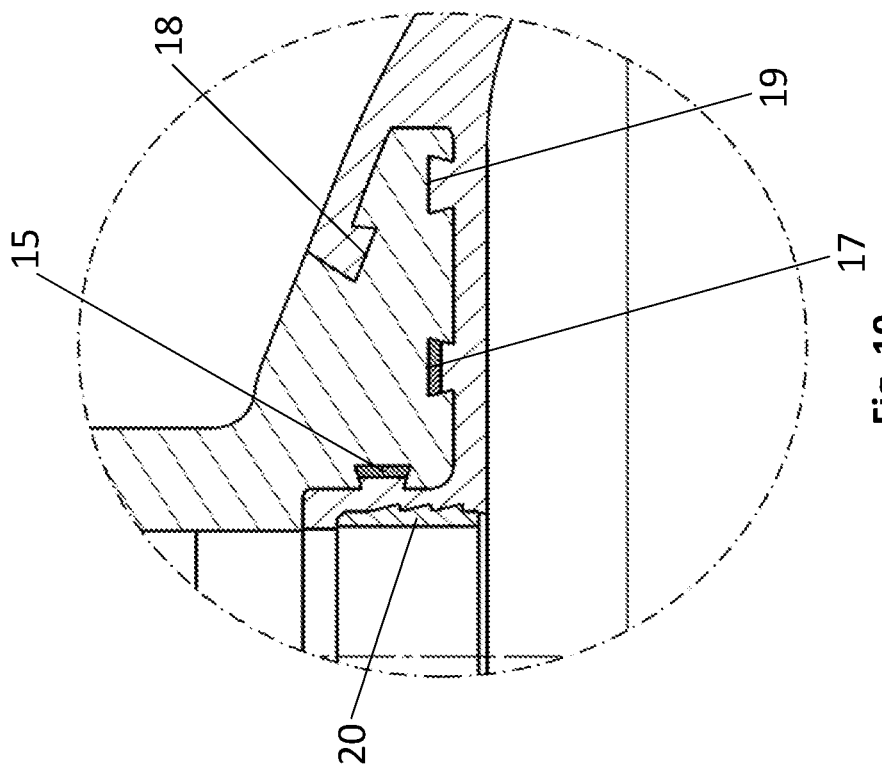
FIG. 19 illustrates a sectional view of the detail A of the half-shell of FIG. 18.
Figure 18:
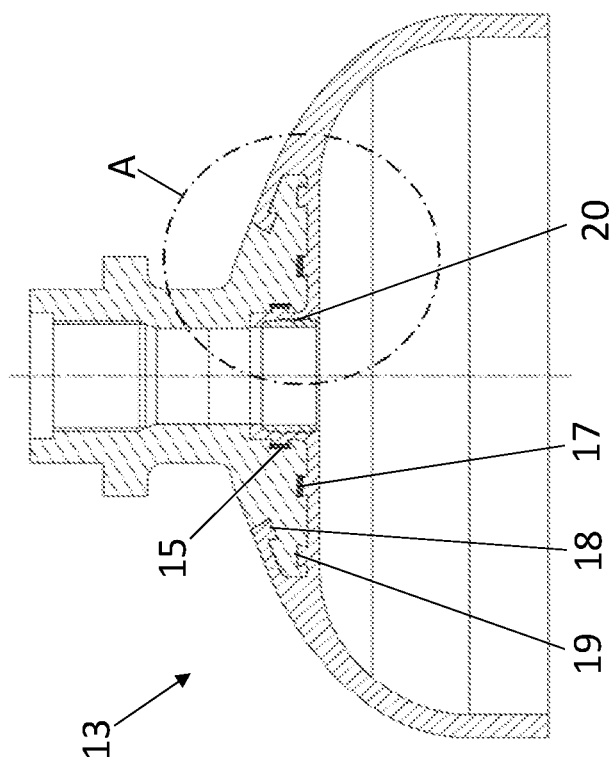
FIG. 18 illustrates a sectional view of a half-shell of a high-pressure vessel, in accordance with one or more embodiments.

As illustrated in FIG. 18 and its detail section of the detail A in FIG. 19, a sealing element can be arranged on the base of the grooves, in particular of the first groove 15 and of the second groove 17. The primary sealing action is effected via the compression of the plastic in the annularly encircling grooves 15 and 17 on the metal lower region, and in the core drill hole of the foot member of the boss 1, respectively. Two further grooves 18, 19 on the disc outer side or disc surface serve in particular for the form fit and the stabilization of the plastic-metal connection.

Optionally, it is possible for a sleeve 20 to be pushed into the core drill hole in the course of the manufacturing process in order to increase the compressive action on the sealing plastics material in the first groove 15.

As illustrated in FIG. 19, in a further option, the one or both seal grooves 15, 17, are provided with an additional sealing element in order to increase the sealing action in that region.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Insert member, boss
2 First tool half
3 First plastics plate
4 Slider
5 Second tool half
6 Second plastics plate
7 Receptacle
10 Cylinder
11 Multilayer composite plastic
12 Barrier layer
13 Half-shell
14 Foot member
15 First groove
16 Fibre material
17 Second groove
18 Third groove
19 Fourth groove
20 Sleeve

What is claimed is:

1. A high-pressure vessel comprising:
   a cylinder, forming a middle region of the high-pressure vessel, composed of a multilayer composite plastic comprising a first barrier layer;
   at least one half-shell, at an axial end of the cylinder, composed of a multilayer composite plastic comprising a second barrier layer;
   a substantially rotationally symmetrical insert member having a foot member at that end thereof which faces an interior of the high-pressure vessel, the foot member having a diameter that is greater than a diameter of a middle region of the insert member, wherein the foot member is configured to substantially form a hollow cone or hollow cylinder and a first groove extending around on an inner circumference of the foot member, and a second groove extending around on a top surface of the foot member that faces an outer side of the high-pressure vessel, wherein the first groove and the second groove are filled with the multilayer composite plastic of the at least one half-shell, and the multilayer composite plastic is arranged axially on a first side and a second side of the foot member; and
   a sealing element arranged in the first groove.

2. The high-pressure vessel of claim 1, further comprising a sleeve arranged radially inside of the first groove, and on an inner circumference of the foot member.

3. The high-pressure vessel of claim 2, wherein the multilayer composite plastic of the half-shell is pushed by the sleeve against the inner circumference of the foot member and into the first groove.

4. The high-pressure vessel of claim 1, wherein the multilayer composite plastic of the cylinder transitions into the multilayer composite plastic of the half-shell.

5. The high-pressure vessel of claim 1, wherein the multilayer composite plastic of the half-shell comprises at least one layer composed of a high-density polyethylene (HDPE) layer, and the first barrier layer, the first barrier layer comprising ethylenevinyl alcohol copolymer (EVOH).

6. The high-pressure vessel of claim 5, wherein the multilayer composite plastic of the half-shell further comprises one or more of a regranulate, a second HDPE layer, and at least one adhesion-promoter layer.

7. The high-pressure vessel of claim 1, wherein the second groove is configured to increase a tightness between the multilayer composite plastic and the insert member and thereby prevent detachment of the multilayer composite plastic from the insert member.

8. A high-pressure vessel comprising:
   a multilayer composite plastic forming two half-shells;
   a substantially rotationally symmetrical insert member having a foot member at that end thereof which faces an interior of the high-pressure vessel, the foot member having a first groove extending around on an inner circumference of the foot member, a second groove extending around on a base of the foot member that faces an interior of the high-pressure vessel, and a third groove extending around on a top surface of the foot member that faces an outer side of the high-pressure vessel, wherein the first groove, the second groove, and the third groove, are filled with the multilayer composite plastic of the one of the half-shells, and the multilayer composite plastic is arranged axially on a first side and a second side of the foot member;

a first sealing element arranged in the first groove; and a second sealing element arranged in the second groove.

9. The high-pressure vessel of claim 8, further comprising a sleeve arranged radially inside of the first groove, and on an inner circumference of the foot member.

10. The high-pressure vessel of claim 9, wherein the multilayer composite plastic of the half-shells is pushed by the sleeve against the inner circumference of the foot member and into the first groove.

11. The high-pressure vessel of claim 8, wherein the third groove is configured to maintain the multilayer composite plastic in position by increasing a tightness between the multilayer composite plastic and the insert member, and prevent detachment of the multilayer composite plastic from the insert member on the top surface of the foot member.

12. The high-pressure vessel of claim 8, further comprising a fibre material comprising a composite material that encapsulates the half-shells.

13. A high-pressure vessel comprising:

a multilayer composite plastic forming two half-shells;

a substantially rotationally symmetrical insert member having a foot member at that end thereof which faces an interior of the high-pressure vessel, the foot member having a first groove extending around on an inner circumference of the foot member, a second groove extending around on a base of the foot member that faces an interior of the high-pressure vessel, a third groove extending around on a top surface of the foot member that faces an outer side of the high-pressure vessel, and a fourth groove extending around on the base of the foot member that faces the interior of the high pressure vessel, wherein the first groove, the second groove, the third groove, and the fourth groove are filled with the multilayer composite plastic of one of the half-shells, and the multilayer composite plastic is arranged axially on a first side and a second side of the foot member;

a first sealing element arranged in the first groove; and a second sealing element arranged in the second groove.

14. The high-pressure vessel of claim 13, further comprising a sleeve arranged radially inside of the first groove, and on an inner circumference of the foot member.

15. The high-pressure vessel of claim 13, wherein:

the third groove is configured to maintain the multilayer composite plastic in position by increasing a tightness between the multilayer composite plastic and the insert member, and prevent detachment of the multilayer composite plastic from the insert member on the top surface of the foot member, and the fourth groove is configured to maintain the multilayer composite plastic in position by increasing a tightness between the multilayer composite plastic and the insert member, and prevent detachment of the multilayer composite plastic from the insert member on the base surface of the foot member.

16. The high-pressure vessel of claim 13, further comprising a fibre material comprising a composite material that encapsulates the half-shells.

* * * * *